Nov. 4, 1969  D. R. BURTON  3,475,918
COOLING APPARATUS EMPLOYING CARBON DIOXIDE
Filed Nov. 13, 1967
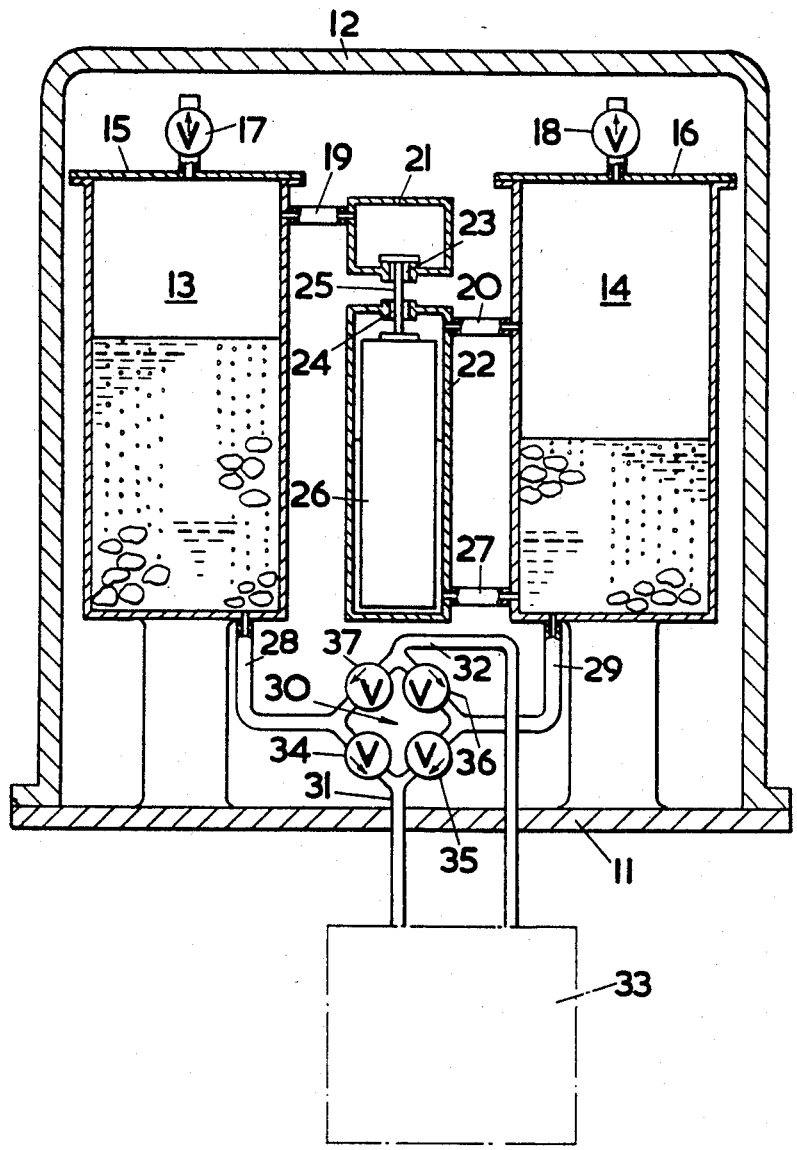
Derek Rodney Burton
*Inventor*
By
Cushman, Darby & Cushman
*Attorneys*

United States Patent Office
3,475,918
Patented Nov. 4, 1969

3,475,918
COOLING APPARATUS EMPLOYING CARBON DIOXIDE
Derek Rodney Burton, Highett, Victoria, Australia, assignor to Minister of Technology in Her Britannic Majesty's Government of the United Kingdom of Great Britain and Northern Ireland, London, England
Filed Nov. 13, 1967, Ser. No. 723,957
Int. Cl. F25d 3/12
U.S. Cl. 62—165                                                     4 Claims

ABSTRACT OF THE DISCLOSURE

A supply system for supplying cooling liquid to cooling apparatus comprises a pair of pressure vessels for containing solid carbon immersed in water, control valve and connecting means for alternately effecting a unidirectional flow of coolant from one pressure vessel through cooling apparatus to the other pressure vessel along a first path and a unidirectional from the other pressure vessel through cooling apparatus to the one pressure vessel along a second path, and vent and sealing valve means connected to the pressure vessels which according to the relative fluid levels in the vessels vent one of the vessels while sealing the other so that gas pressure, developed from the carbon dioxide and water, alternately builds up withon one vessel and then the other vessel causing flow of coolant back and forth between the vessels through the control valve and connecting means.

---

This invention relates to supply systems for supplying coolant to cooling apparatus of the type in which liquid at low temperature is used as a heat transfer medium to absorb heat from a body or article to be cooled.

The invention is particularly useful as a supply system for supplying a cooling heat transfer liquid to a liquid cooled garment of the type proposed for aviators and as disclosed in United States Patent Nos. 3,316,732 and 3,392,545.

One of the problems associated with cooling apparatus of the type referred to is the difficulty of maintaining a connection to a power source, for example a source of electrical power, which may be necesary for pumping the cooling liquid and/or providing the energy for cooling. This problem is even more acute in the case of a liquid cooled garment where the wearer may be required to walk and move to perform a particular task.

The present invention is concerned with the provision of an improved supply system for supplying cooling liquid to cooling apparatus of the type referred to.

According to the present invention a supply system for supplying cooling liquid to cooling apparatus of the type referred to comprises a hollow pressure vessel containing solid carbon dioxide immersed in water wherein gas pressure developed by the evaporation of the solid carbon dioxide forces water cooled by the solid carbon dioxide to the cooling apparatus.

Preferably, a supply system for supplying cooling liquid to cooling apparatus of the type referred to according to the present invention comprises a pair of hollow sealable pressure vessels for containing solid carbon dioxide immersed in water and wherein gas pressure developed by the dissociation of the solid carbon dioxide forces the cooled water from the one vessel through the cooling apparatus and back to the other vessel or vice versa there being automatic control valve means intermediate the vessels and the cooling apparatus for controlling the flow of cooling liquid and vent and sealing valves are provided for automatically venting one vessel and sealing the other according as said vessels are receiving liquid and supplying it, respectively, or vice-versa.

An alternating flow of cooling liquid is thus provided from the one vessel through the cooling apparatus and back to the other vessel and vice-versa.

Accordingly, in one preferred arrangement a supply system for supplying cooling liquid to cooling apparatus of the type referred to comprises a pair of hollow sealable pressure vessels for containing solid carbon dioxide immersed in water, connections for cooling liquid lead from below liquid level in both vessels to first control valve means for liquid which permit passage of cooling liquid from the one vessel to the cooling apparatus and back to the other vessel, and vice versa, depending on the pressures existing in said vessels, and, connections for gas lead from above liquid level from both vessels to separate gas chambers, respectively, gas flow to atmosphere from which is controlled by second control valve means for gas which are closed in the one sense by gas pressure developed in said one vessel which pressure is operative to pump cooling liquid from said one vessel through the first control valve means to the cooling apparatus and back to the other vessel from which latter gas may leak past the second control valve means and upon the liquid level in said other vessel rising to a predetermined upper level the second control valve means are closed in the other sense whereby gas pressure developed in said other vessel forces cooling liquid from it in the reverse sense thorugh the first control valve means and the cooling apparatus to said one vessel from which latter gas may escape past the second control valve means, this reverse cycle continuing until the liquid level falls to a predetermined low value in said other vessel whereupon the cycle is reversed again.

Preferably, the second control valve means for gas comprises a double acting obturating member which is operative to close in said one sense due to gravity and to be held closed by gas pressure developed in said one vessel and movable under the influence of a float in a float chamber, to which latter liquid is fed from said other vessel, to close in the other sense and to be held closed by the gas pressure then developed in said other vessel.

Preferably also the first control valve means for liquid comprises a four way liquid rectifier valve providing a path for liquid from said one vessel through a first non-return valve to the cooling apparatus and from said apparatus via a second nonreturn valve to the other vessel for operation in the one sense, and, providing a similar path for liquid from the other vessel through a third non-return valve to the cooling apparatus and from said apparatus through a fourth non-return valve to said one vessel for operation in the other sense.

Safety non-return valves may be provided in both vessels at above liquid level.

One arrangement of a supply system according to the invention for supplying cooling liquid to a liquid cooled garment is illustrated by the accompanying diagrammatic drawing which is a sectional side elevation.

As shown the system comprises a heat insulating base 11 and a hollow heat insulating cover 12. Two hollow pressure vessels 13, 14 having removable pressure tight lids 15 and 16, respectively, are supported on the base 11. Non-return safety valves 17, 18 are provided in the lids 15 and 16, respectively. Connections 19, 20 for gas lead from the vessels 13 and 14 to gas chambers 21, 22 having outlets 23, 24 respectively, the gas flow through which latter is controlled by a double acting obturating member 25. The obturating member 25 is carried by a float 26 housed in the gas chamber 22 which latter also has a connection 27 for liquid with the lower region of the vessel 14. Connections 28, 29 for liquid lead from the vessels 13, 14 respectively to control valve means 30 and further connections 31, 32 for liquid lead from said valve means 30 to cooling apparatus indicated generally at 33. The control valve means 30 has four separate non-return valves 34, 35, 36 and 37.

In operation pieces of solid carbon dioxide are placed in the pressure vessels 13 and 14 and covered with water to the same level until the vessels are approximately half full. There follows an immediate violent effervescent action as gas is given off and this continues until the pieces of solid carbon dioxide are each coated with ice when the action slows down but gas continues to be given off. The lids 15 and 16 are then positioned to seal the vessels 13 and 14. The level of liquid in the vessel 14 and hence in the gas chamber 22 is sufficient to cause the float 26 and the obturating member 25 to rise to close the outlet 25 and open the outlet 23. Gas pressure developed in the now sealed vessel 14 is operative to force cooling liquid from the vessel 14 through the connection 29 to the control valve 30. Here it flows through the non-return valve 35 to the connection 31 and then to the cooling apparatus 33. From the cooling apparatus 33 the liquid flows through the connection 32 to the control valve 30, through the non-return valve 37 to the connection 28 and then to the other vessel 13. It will be noted that the liquid will not flow back to the vessel 14 through the non-return valve 36 as there will be a pressure difference across this valve sufficient to hold it closed. The cooling liquid entering the vessel 13 will have absorbed heat in the cooling apparatus and gas will be given off in the vessel 13. This gas will escape through the outlet 23 and, if the pressure is high enough, through the safety non-return valve 17. This liquid flow continues until the liquid level in the vessel 14 and chamber 22 drops to a level at which the float moves the obturating member 25 to open the outlet 24 and close the outlet 23. Gas pressure developed in the vessel 14 can now leak away through the connection 20, chamber 22 and the outlet 24. At the same time the gas pressure developed in the vessel 13 is now operative to hold the obturating member 25 down to close the outlet 23 and to force liquid from the vessel 13 in to the connection 28. From here it flows to the control valve 30 and passes through the non-return valve 34, connection 31 to the cooling apparatus 33 and thence through the connection 32 and non-return valve 36 to the vessel 14. It is to be noted that the liquid will not flow through the non-return valve 37 as there will be a pressure difference across the latter sufficient to hold it closed. This cycle will continue until the liquid level in the vessel 14 and the chamber 22 again reaches a level sufficient to raise the float so that the obturating member again closes the outlet 24. The cycle of reversed flow will then again be repeated until the solid carbon dioxide has been used up.

A particular advantage of the invention is that it is small enough to be carried on a wearer's back and when the cooling apparatus is a liquid cooled suit, enables an operative to be independent of external power connections such as for example electrical power connections which would otherwise be required to provide power for pumping and cooling.

I claim:

1. A supply system for supplying cooling liquid to cooling apparatus comprising a pair of hollow pressure vessels for containing solid carbon dioxide immersed in water, closure means for sealing each of said pressure vessels, automatic control valve means, connections for cooling liquid connecting each of said pressure vessels to said control valve means, connections for cooling liquid for connecting said control valve means to cooling apparatus, vent and sealing valve means intermediate said pressure vessels, connections for fluid connecting said vent and sealing valve means to each of said pressure vessels, respectively, and wherein when solid carbon dioxide and water are placed in said pressure vessels and said supply system is connected to a cooling apparatus gas pressure developed as a result of the evaporation of solid carbon dioxide immersed in water and contained in said pressure vessels forces water cooled by said carbon dioxide from one pressure vessel through said control valve means to the cooling apparatus to which said supply system is connected, and back through said control valve means to the other pressure vessel and said vent and sealing valve means being responsive to conditions obtaining in said pressure vessels to vent said one pressure vessel and to seal the other pressure vessel accordingly as said vessel are receiving cooling water and supplying it, respectively, and vice versa.

2. A supply system as claimed in claim 1 in which said vent and sealing valve means comprise, a first gas chamber, a second gas chamber, connections for gas under pressure leading from said one pressure vessel to said first chamber and said other pressure vessel to said second chamber, repectively, a double acting obturating member extending between said first and second gas chambers, a float operatively associated with said obturating member, a connection for liquid leading from said other pressure vessel to said chamber, and when solid carbon dioxide and water are placed in said pressure vessels and said supply system is connected to a cooling apparatus said obturating member is operative to close said first chamber under the influence of gravity and is held in this position by the gas pressure developed in said one pressure vessel and first chamber when the liquid level in said other pressure vessel falls below a predetermined level and which pressure is operative to pump cooling water from said one pressure vessel through said automatic control valve and said cooling apparatus to which said supply system is connected and back through said automatic control valve to said other pressure vessel, and said obturating member is operative at the same time to vent gas from said second gas chamber and said other pressure vessel, and, upon the liquid level in said other pressure vessel rising to the predetermined level the float is operative to move the obturating member to close said second gas chamber and to vent said first chamber and the obturating member is held in this position by the gas pressure in said second chamber, and said gas pressure is operative to pump cooling water in a reverse sense from said other pressure vessel through said automatic control valve and said cooling apparatus to which said supply system is connected and back through said automatic control valve to said one pressure vessel, this reverse cycle continuing until the liquid level in said other pressure vessel falls below the predetermined value whereupon the cycle is again reversed.

3. A supply system as claimed in claim 1 in which said automatic control valve comprises, a first passage for cooling water leading from said one pressure vessel and for leading to cooling apparatus, a first non-return valve in said first passage, a second passage for water for leading from cooling apparatus and leading to said other pressure vessel, a second non-return valve in said second passage, a third passage for cooling water leading from said other pressure vessel and for leading to cooling apparatus, a third non-return valve in said third passage, a fourth passage for water for leading from cooling apparatus and leading to said one pressure vessel, and a fourth non-return valve in said fourth passage.

4. A supply system as claimed in claim 1 in which said vent and sealing valve means comprise, a first gas chamber, a second gas chamber, connections for gas under pressure leading from said one pressure vessel to said first chamber and said other pressure vessel to said second chamber, respectively, a double acting obturating member extending between said first and second gas chambers, a float operatively associated with said obturating member, a connection for liquid leading from said other pressure vessel to said second chamber, and when solid carbon dioxide and water are placed in said pressure vessels and said supply system connected to a cooling apparatus said obturating member is operative to close said first chamber under the influence of gravity and is held in this position by the gas pressure developed in said one pressure vessel and first chamber when the liquid level in said other pressure vessels falls below a predetermined level and which pressure is operative to pump cooling water from said one pressure vessel through said automatic control valve and said cooling apparatus to which said supply system is connected and back through said automatic control valve to said other pressure vessel, and said obturating member is operative at the same time to vent gas from said second gas chamber and said other pressure vessel, and, upon the liquid level in said other pressure vessel rising to the predetermined level the float is operative to move the obturating member to close said second gas chamber and to vent said first chamber and the obturating member is held in this position by the gas pressure in said second chamber, and said gas pressure is operative to pump cooling water in a reverse sense from said other pressure vessel through said automatic control valve and said cooling apparatus to which said supply system is connected and back through said automatic control valve to said one pressure vessel, this reverse cycle continuing until the liquid level in said other pressure vessel falls below the predetermined value whereupon the cycle is again reversed and, wherein said automatic control valve comprises a first passage for cooling water leading from said one pressure vessel and for leading to cooling apparatus, a first non-return valve in said first passage, a second passage for water for leading from cooling apparatus and leading to said other pressure vessel, a second non-return valve in said second passage, a third passage for cooling water leading from said other pressure vessel and for leading to cooling apparatus, a third non-return valve in said third passage, a fourth passage for water for leading from cooling apparatus and leading to said one pressure vessel, and, a fourth non-return valve in said fourth passage.

References Cited

UNITED STATES PATENTS

| | | | |
|---|---|---|---|
| 1,634,089 | 6/1927 | Slate | 62—386 |
| 1,907,301 | 5/1933 | Martin | 62—386 |
| 2,176,289 | 10/1939 | Beebe | 62—384 |
| 2,383,486 | 8/1945 | Isenberg | 62—384 |
| 2,450,713 | 10/1948 | Brunsing | 62—165 |

MEYER PERLIN, Primary Examiner

U.S. Cl. X.R.

62—384, 386

PO-1050
(5/69)

UNITED STATES PATENT OFFICE
CERTIFICATE OF CORRECTION

Patent No. 3,475,913          Dated November 4, 1969

Inventor(s) Derek Rodney Burton

It is certified that error appears in the above-identified patent and that said Letters Patent are hereby corrected as shown below:

In Column 1, line 20, after "unidirectional" insert -- flow --; line 27, change "withon" to -- within --.

SIGNED AND SEALED
MAR 24 1970

(SEAL)
Attest:

Edward M. Fletcher, Jr.
Attesting Officer

WILLIAM E. SCHUYLER, JR.
Commissioner of Patents